United States Patent [19]
Severance et al.

[11] 4,265,957
[45] May 5, 1981

[54] MULTI-LAYERED, FIBERGLASS-REINFORCED FLOOR COVERING SYSTEMS

[75] Inventors: Wesley A. Severance, Independence; Julie Y. L. Shaw, Broadview Heights, both of Ohio

[73] Assignee: General Signal Corporation, Stamford, Conn.

[21] Appl. No.: 92,577

[22] Filed: Nov. 8, 1979

[51] Int. Cl.[3] .................................................. B32B 5/02
[52] U.S. Cl. ...................................... 428/143; 404/82; 427/136; 427/386; 427/407.1; 427/410; 428/141; 428/142; 428/215; 428/283; 428/284; 428/285; 428/286; 428/339; 428/413; 428/415; 428/423.1
[58] Field of Search ............... 428/141, 142, 143, 144, 428/215, 246, 251, 247, 283, 284, 285, 310, 325, 327, 329, 331, 333, 339, 334, 413, 415, 417, 423.1, 286; 427/136, 386, 393.6, 407.1, 410; 404/82

[56] References Cited

U.S. PATENT DOCUMENTS

| | | | |
|---|---|---|---|
| 3,334,555 | 8/1967 | Nagen et al. | 427/136 |
| 3,396,138 | 8/1968 | Weller | 428/413 |
| 3,486,925 | 12/1969 | Hoffman | 428/413 |
| 3,510,339 | 5/1970 | Wile | 428/413 |
| 3,795,533 | 3/1974 | Gauri | 428/413 |
| 3,908,043 | 9/1975 | Evans et al. | 428/423.3 |
| 4,013,598 | 3/1977 | Evans et al. | 428/413 |

*Primary Examiner*—James J. Bell
*Attorney, Agent, or Firm*—Cooper, Dunham, Clark, Griffin & Moran

[57] ABSTRACT

This invention discloses multi-layered, fiberglass-reinforced floor covering systems which provide such highly desired properties as chemical resistance, abrasion resistance, low-temperature curing, thermal shock resistance and the capability of bridging shrinkage cracks, control joints and the like. One particularly desirable application of the floor constructions of this invention is in the pharmaceutical and food industry. This application is based upon the fact that the floor constructions provided are stain resistant, color stable, and do not permit the growth of fungi or bacteria.

The multi-layered floor constructions of the present invention comprise in ascending laminated form a floor substrate such as a porous concrete floor, a primer coat of an epoxy resin, a fiberglass-reinforced base coat of an epoxy resin, a top coat of an epoxy resin containing filler material, and a sealer coat of a polyurethane resin.

44 Claims, No Drawings

MULTI-LAYERED, FIBERGLASS-REINFORCED FLOOR COVERING SYSTEMS

BACKGROUND OF THE INVENTION

It is well known that porous floors, particularly concrete floors, corrode or otherwise deteriorate in the presence of numerous materials such as inorganic acids, organic solvents, and solutions of salts. In the latter case, deterioration of the concrete is thought to occur by diffusion of the salt into the porous concrete where it crystallizes causing expansion and cracking.

In order to protect the floor surfaces from such corrosion or deterioration various coverings have been employed including coatings of naturally derived materials such as asphalts and linseed oil and of synthetic polymeric materials, particularly epoxies. Merely by way of examples, U.S. Pat. Nos. 4,078,117; 3,861,944; 4,057,664; 4,091,148; 3,850,661; 4,153,743; 3,811,911; and 4,004,054 discloses various materials useful in protecting floor or concrete surfaces from corrosion or deterioration.

None of the floor covering materials so employed is entirely satisfactory. Some materials fail to provide adequate protection or are completely ineffective under certain conditions. Thus, for example, a common problem encountered is due to the different coefficients of expansion of the underlying floor and of the covering material. Upon sudden changes in the temperature of the floor, cracking results requiring floor repair or replacement. In addition to the need to protect the underlying floor substrate from deterioration, it is often desirable to provide certain properties such as improved chemical resistance, abrasion resistance, the capability of bridging shrinkage cracks, control joints and the like, and thermal shock resistance.

To provide such properties, while also providing protection of the underlying floor substrate, multilayered or laminated floor constructions have been utilized. In such a structure, each of the various layers provides some desired property or properties so that the composite floor construction exhibits properties not obtainable with a single coating or covering layer.

Thus, for example, U.S. Pat. No. 3,510,339 discloses a coating system for floors, including concrete floors, which includes an epoxy resin primer coating, an aggregate layer which includes a filler such as quartz deposited thereover and top coating layer of an epoxy resin.

U.S. Pat. Nos. 4,013,598 and 3,908,043 teach a floor construction which includes a concrete substrate, a primer coating layer of an epoxy resin, an intermediate layer of a synthetic resin such as an epoxy resin, and a top coating layer of a polyurethane layer.

U.S. Pat. No. 3,795,533 discloses a method for preserving and/or strengthening porous materials including concrete which involves impregnating the concrete with repeated coatings of an epoxy resin which may additionally include an inert filler, such as silica, and placing a top coating layer of a polyurethane resin thereover.

U.S. Pat. No. 3,993,823 discloses a synthetic resin floor construction which comprises a concrete substrate, a primer coat of epoxy resin, an intermediate layer of an epoxy resin and filler and a top coat of a polyester resin.

Finally, U.S. Pat. No. 4,025,683 discloses a laminated coating construction which includes a concrete substrate, a primer coat of a synthetic resin, an intermediate coating layer of polyurethane resin and filler, a tack coat of asphalt, and a layer of asphaltic concrete placed thereover.

The discovery of improved hardening agents for use in coatings greatly expanded the potential of laminated floor constructions based upon the use of synthetic resins. The incorporation of such hardening agents in floor constructions may provide permanent structural flexibility so that thermal shock or cycling would cause little or no damage to the floor. Also, the utilization of such agents enabled curing of the synthetic resins to be accomplished at low temperatures and in the presence of water.

Several years ago a multi-layered floor construction was developed which provided certain of the desirable properties discussed hereinabove. This multi-layered floor construction included a floor substrate, particularly a concrete substrate, a primer coating layer of an epoxy resin, a fiberglass-reinforced base coating layer of an epoxy resin, a self-leveling top coating layer of an epoxy resin having filler material incorporated therein, and a grit coat of an epoxy resin having a particle filler material included therein.

Although this laminated floor construction provided numerous desirable properties, it suffered from several disadvantages. Thus, this floor construction had a tendency to stain under certain circumstances such as upon exposure to certain foods, pharmaceutical materials, and urine which may contact the floor in laboratory animal rooms. Also, prior art floor covering systems based upon epoxy resins tended to yellow or chalk upon exposure to ultraviolet or infrared light. Another disadvantage is that with epoxy sealer or grit coating layers it was not possible to obtain both self-leveling properties and non-glossy surface characteristics. Moreover, the previous laminated floors provided less than optimally desirable abrasion resistance, acid resistance and color stability.

In accordance with the present invention, multi-layered, fiberglass-reinforced floor constructions are disclosed which overcome the aforementioned disadvantages and provide improved chemical resistance, abrasion resistance, thermal shock resistance and color stability. Moreover, the laminated floor constructions of this invention provide high stain resistance and retard or prevent the growth of fungi or bacteria. As a result these floor constructions are highly desirable for use in the food and pharmaceutical industries where substantial governmental regulation exists requiring high standards of cleanliness, non-toxicity and the like.

SUMMARY OF THE INVENTION

The present invention provides multi-layered, fiberglass-reinforced floor constructions which provide the aforementioned advantages. These floor constructions comprise a floor substrate, a cured primer coat of an epoxy resin applied over and adhering to the floor substrate, a cured, fiberglass-reinforced base coat of an epoxy resin applied over and bonded to the primer coat, a cured top coat of an epoxy resin containing filler material applied over and bonded to the base coat, and a cured sealer coat of a polyurethane resin applied over and bonded to the top coat. This invention also provides a method of forming the multi-layered, fiberglass-reinforced floor constructions described herein.

DETAILED DESCRIPTION OF THE INVENTION

In accordance with the present invention multi-layered floor constructions are provided having desirable properties such as chemical resistance, abrasion resistance, low-temperature curing, thermal shock resistance, stain resistance, and color stability.

The floor substrate of this invention may be any of the known conventional substrates such as concrete, wood, steel, brick and the like. The most commonly used substrate is likely to be concrete although it is to be understood that the invention is not limited to concrete floor substrates.

In general, the floor substrate should be treated or otherwise prepared prior to application of the various coating layers using techniques known in the art in order to provide a textured surface. If foreign substances such as dirt, grease or oil are present they should be removed.

If the substrate is cured concrete, it should be cleaned and dried of excess water. Preferably, the concrete should have a minimum strength of 3,000 psi compressive strength and 200 psi tensile strength. Also, the concrete surface is typically prepared by a conventional technique such as by acid etching, e.g., using muriatic acid, by sand blasting or by scarifying.

PRIMER COAT

Over the floor substrate is applied a primer coat of an epoxy resin which is capable of adhering to the surface of the substrate. Typically, the epoxy resins employed will be liquid in form. Nevertheless, in practice an organic solvent or thinner, e.g., methyl ethyl ketone, toluene or xylene is also present. However, the epoxy may alternatively be in the form of an aqueous or non-aqueous emulsion of which several are commercially available. Although numerous thermosetting epoxy resins are useful in the practices of this invention the type most typically employed are those which are condensation products of epichlorohydrin and bisphenol A. Alternatively, an aliphatic polyol such as glycerol may be used instead of the aromatic bisphenol A. Molecules of this type have glycidyl ether structures, $-OCH_2CHOCH_2$, in the terminal positions, have many hydroxyl groups, and cure readily with amines. In addition to the epoxy resin, the primer coat preferably contains a curing agent such as an amine. Additional materials such as pigments or wetting agents, e.g. silanes, may also be included.

In a preferred embodiment, the curing agent is an adduct from a polyglycidyl ether of a polyphenyl and a cycloaliphatic or cycloaliphatic-aliphatic di-primary diamine. Such adducts are disclosed in U.S. Pat. No. 3,629,181, the disclosure of which is hereby incorporated into the disclosure of the present invention.

The polyglycidyl ethers which are liquid at room temperatures, that is, at about 25° C. are derived from polyhydric phenols or polyphenols such as resorcinol, phenol-formaldehyde condensation products of the type of cresols or novalacs, bis-(p-hydroxyphenyl)-methane and especially 2,2-bis-(p-hydroxyphenyl)-propane(=diomethane).

Possible di-primary diamines for the adduct formulation include: 1,2-diamino cyclohexane, 1,8-diamino-p-methane, 1,2-diamino-4-ethyl cyclohexane, 3-amino methyl-3,5,5-trimethyl-1-cyclohexyl amine and 4,4-methylene-bis(2-methylcyclohexylamine).

As is provided in the aforementioned U.S. Pat. No. 3,629,181, the most useful curing agents for epoxy resins are adducts from polyglycidyl ethers of polyphenyls and cycloaliphatic or cycloaliphatic-aliphatic di-primary diamines, in which at least one of the primary amino groups is bonded to an endocyclic carbon atom of a cycloaliphatic ring with the proviso that 1.5 to 2.7 moles of diamine are employed per 1 epoxide equivalent of the polyglycidyl ether. However, in this invention it has been found that adducts having a mole ratio of diamine per epoxide greater than 2.7 are not only useful but are preferred. Thus, for example, curing agents having mole ratios of 2.875, 2.89 and 3.18 have been employed.

The ratio of epoxy resin to curing agent may vary over a wide range such as from about 1:1 to about 10:1 by volume, preferably about 4:1. After mixing the epoxy resin and curing agent, the mixture may be thinned if desired, e.g. by about 20 percent, with methyl ethyl ketone.

The epoxy resin containing mixture is then applied over the floor substrate to a dry thickness of from about 1 to about 5 mils using conventional techniques such as brush, roll or spray application.

Since the epoxy resin and curing agent react upon mixing, the mixture thereof must be promptly applied to the floor substrate, the outer limit on application time depending upon temperature. Thus, for example, at 30° F. (1° C.) hardening does not occur for about 24 hours whereas at 90° F. (32° C.) hardening occurs in about 3 hours.

After application of the primer coat, curing occurs at ambient temperatures in from about 3 to about 20 hours, typically from about 6 to about 14 hours. After this time has elapsed and a cured primer coat adhering to the substrate has been formed, the fiberglass-reinforced, base coat can be applied.

FIBERGLASS-REINFORCED BASE COAT

A layer of a viscous epoxy resin is next applied over the cured primer coat. The epoxy resin may be applied in a conventional manner such as by rolling or troweling, typically the latter using a serrated trowel, to a wet thickness from about 50–60 mils.

The epoxy resin may be any of the epoxy resins described hereinabove although it is typically the same as the epoxy resin of the primer coat. As in the case of the primer coat the epoxy resin base coat preferably includes a curing agent such as an amine or one of the adducts previously described, and may contain further additives such as pigments. Generally, no thinner or solvent is present.

While the epoxy resin is uncured, usually less than one hour, preferably less than about 5 minutes, a permeable fiberglass mat is placed thereon. The base coat may then be dry rolled e.g., using a short-nap paint roller to wet out the fiberglass mat. The fiberglass mat materials may be any of the commercially available fiberglass mat products. Typically the fiberglass mat is in the form of rolls which are easier to work with. The fiberglass mat useful in the practices of this invention may have a density from about ½ to about 2 ounces/square foot, preferably about 1 ounce/square foot.

The epoxy resin fills the permeable fiberglass mat to form a substantially unitary mass as a base coat layer, the resulting layer being about 20 to about 50 percent fiberglass by weight, preferably about 30 percent. The fiberglass-reinforced base coat is then permitted to cure at ambient temperatures. The resulting cured, fiberglass-reinforced base coat is securely bonded to the primer coat and has a dry thickness from about 1/8 inch to about 1/32 inch.

TOP COAT

Next, a layer of an epoxy resin having filler material admixed therewith is applied over the cured, fiberglass-reinforced base coat as a self-leveling or partially self-leveling top coat. The filled epoxy resin may be applied by conventional techniques such as with a trowel or squeegee. It is typically applied at a dry thickness from about ¼ inch to about 1/16 inch.

The epoxy resin of the top coat may be any of the epoxy resins described hereinabove although commonly the same epoxy resin is used for the top coat as for the base coat. The epoxy resins most often employed in the top coat are those which are condensation products of epichlorohydrin and bisphenol A.

The filler material which is admixed with the epoxy resin may be any of the widely known conventional filler materials including inorganic fillers such as silica, glass beads, metallic oxides, e.g. aluminum oxide, or organic fillers such as cellulosic materials, e.g. kraft fiber or mixtures thereof. Preferably, the filler material is in the form of solid particles, a major portion of which have particle sizes less than about 20 mesh, and comprises an amount greater than about 50 percent by weight based upon the weight of the total coat layer.

In one embodiment of this invention in which the self-leveling property of the top coat is more pronounced, the amount of filler present is in the range from about 50 percent to about 70 percent by weight.

In this embodiment, the filler particles are also somewhat smaller, and a major portion, e.g. greater than 75%, passes through a 100 mesh screen and nearly 35% passes through a 325 mesh screen.

In another embodiment having less self-leveling characteristics the amount of filler present is in the range from about 70 percent to about 90 percent by weight.

In this embodiment the filler particles are somewhat larger and a major portion, e.g. greater than 75%, will not pass through a 100 mesh screen.

The top coat layer also preferably includes a curing agent such as an amine or one of the adduct curing agents previously described. Additionally, the top coat layer may contain further additives such as pigments, diluents such as butyl glycidyl ether, plasticizers and agents to improve flow properties and accelerate bubble release.

After application of the top coat, curing occurs at ambient temperatures in from about 3 to about 20 hours, typically from about 6 to about 14 hours. After this time has elapsed and a cured top coat bonded to the base coat has been formed, the sealer coat may be applied.

SEALER COAT

After the top coat has cured, a sealer coat of a polyurethane resin having a dry thickness from about 2 to about 20 mils is applied thereover by any of the conventional methods described herein.

In the practices of this invention, those polyurethane resins are preferred which are produced by the condensation reaction of a polyisocyanate or prepolymer thereof and a polyol, that is, a polyhydric alcohol containing several hydroxyl groups such as a glycerol or a sugar alcohol.

The properties of the polyurethane sealer coat are largely dependent upon the polyol and polyisocyanate or polyisocynate prepolymer used. Thus, for example, polyols or polyisocyanates of lower equivalent weight produce sealer coats having harder surface properties. The more functional polyols such as branched, diol and triol or polyester polyol, product tougher films having higher chemical and solvent resistance. Polyisocyanates, particularly branched polyisocyanates, having equivalent weights of about 200, produce chemical resistant surfaces. Sealer coats formed from aromatic diisocyanates or prepolymers thereof are faster drying and provide better abrasion and solvent resistance, but may be subject to chalking and light discoloration. As a result aliphatic diisocyanates are preferred in applications where less light sensitivity is required.

Among the polyisocyanates which have been found particularly useful in this invention are adducts of toluene diisocyanate and trifunctional alcohols having the structure

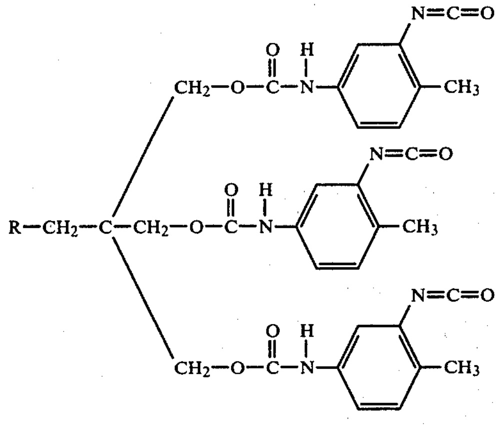

wherein R is alkyl, and adducts of hexamethylene diisocyanate having the structure

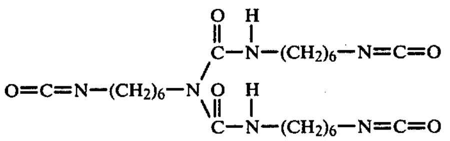

It is also possible to use mixtures of these or related adducts in the practices of this invention.

Useful polyols include epoxy polyols, polyester polyols or acrylic polyols, particularly epoxy polyols. Thus, for example, the polyol may be a high molecular weight solid epoxy resin having a hydroxyl equivalent of 200 and an epoxy equivalent of 2400–2600.

The sealer coat layer preferably also includes a urea formaldehyde polymer such as a cross-linked condensation polymer of urea and formaldehyde comprising small primary particles joined together to form pigment agglomerates having particle sizes less than 10 microns. This material is not only useful as a flatting agent but also increases the bonding strength of the sealer coat to the underlying top coat.

Cured urea formaldehydes having the structure

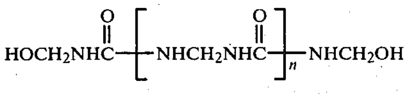

are particularly useful. The amount of urea formaldehyde polymer used may vary but is usually less than about 30 percent by weight based upon the total polyurethane resin present.

Additional additives may be present in the sealer coat including polyethylene waxes to increase abrasion resistance, bentonite, cellulose acetate butyrate to improve flow properties, surfactants, ultraviolet or infrared absorbers, pigments, filler, e.g., silica particles, and the like.

In addition the sealer coat preferably includes a catalyst which may provide greater control over the polyurethane formed. Thus, in a system in which polyol, water and urea formaldehyde may all react the addition of dibutyltin diacetate may give a relative reactivity of about 50:8:1.

When a cross-linked polyurethane is desired, it is usually obtained with best control by using a trifunctional reactant such as a triol or diol-ester, and catalyzing only the isocyanate-hydroxyl reaction. Thus, the end product obtained has better thermal stability than does a biuret or allophanate cross linkage.

Some of the catalysts perform the function of merely splitting the OH bond to make the hydrogen or RO more readily available for reaction with the —NCO, other catalysts have a dual function, in splitting the OH bond and in promoting a complete reaction between any of the various groups remaining after polymerization, or to promote branching cross-linkage and trimerization of the polymer.

Catalysts are usually used in a minor amount like 0.01% of the total resin amount or up. In many formulations, two or more of the catalysts are combined in order to achieve the end properties desired and the speed of the reaction desired for a particular application.

There are two kinds of catalysts—organometallic catalysts and the diamine catalysts. The first is principally used for splitting the —OH bond (but not $—NH_2$) for faster reactions in the system. The second (amino based) type catalysts are (usually) triethylene diamine, morpholines and piperazines) very reactive in almost all systems including NCO/OH, $NCO/NH_2$, NCO/HS, NCO/COOH.

The amine catalyst reactions are easier to control, more even and distributed over a slightly longer period of time. Thus, there is less rise in exothermic temperatures and less chance of inopporture gel with these catalysts than with the metallic catalysts. These amino catalysts are particularly useful in obtaining additional cross-linkage, branching and trimerization in the polymer. They also serve as stiffening agents in the chain, with consequent higher strengths and higher heat resistance.

Metallic cobalt catalysts and the amino catalysts may have adverse effects on the weathering properties of the polymer.

Probably both a metallic and an amine catalyst would be used in one formulation. The ratio and the amount would depend on the property and the dry time of the final product.

Solvents may also be present in the sealer coat. Useful solvents include esters, ketones, ether-esters. Likewise, diluents may also be employed such as toluene, xylol and higher boiling aromatic hydrocarbons of petroleum ether.

Curing of the sealer coat occurs at ambient temperatures in less than 5 hours, typically about 3–4 hours, to form a cured sealer coat which is bonded to the underlying top coat.

The floor construction having the polyurethane sealer coat is particularly suitable for use in hospitals, pharmaceutical companies, meat-packing plants or other locations where the growth of fungi or bacteria must be prevented. The polyurethane sealer coat will also resist degradation due to contact with alkaline cleaning agents, stains (particularly blood stains), and responds well to thermal shock and thermal cycling.

The following examples are set forth to further illustrate the present invention but are not intended in any way to limit the scope thereof as set forth in the accompanying detailed description and claims.

EXAMPLE 1

A liquid epoxy resin was prepared by formulating the following mixture:

| | percent |
|---|---|
| EPON 828[1] | 65.22 |
| DER 732[2] | 21.74 |
| furfuryl alcohol | 13.04 |

[1]One of a series of commercially available epoxy resins based upon condensation reaction of epichlorohydrin and bisphenol-A (Shell Chemical Company).
[2]An epoxy resin obtained from Dow Chemical Company.

To two parts by volume of this liquid epoxy resin was added one part curing agent. The curing agent employed contained the following:

| | percent |
|---|---|
| benzyl alcohol | 36.8 |
| isophoronediamine | 22.9 |
| 1,8-diamino-p-methane | 18.7 |
| salicylic acid | 5.0 |
| EPON 828[1] | 16.6 |

[1]One of a series of commercially available epoxy resins based upon condensation reaction of epichlorohydrin and bisphenol-A (Shell Chemical Company).

The resulting admixture may then be thinned 20 percent with methyl ethyl ketone and applied as a primer coat over freshly finished concrete, using a roller, to a dry thickness of 2 mils. The primer coat cures at 21° C. in about 6 hours to form a cured primer coat. This particular primer coat upon curing also forms a barrier by which moisture is held in the concrete to promote high surface cure. This primer/sealer also protects the concrete surface from corrosive chemicals until permanent protection can be applied, and then functions as the primer coat for the multi-layered, fiberglass-reinforced floor system of this invention.

The following physical properties were determined for this primer/sealer coat:

| | |
|---|---|
| Tensile Strength[3] | 1700–1900 psi |
| Tensile Modulus[3] | 46,000–50,000 psi |
| Tensile Elongation[3] | 20–30% |
| Shear Strength (Steel) | 1700–1800 psi |

[3]ASTM C-307 modified.

EXAMPLE 2

A liquid epoxy resin and a curing agent were prepared and admixed as in Example 1 and applied over a cured primer coat with a serrated trowel deposing the same at approximately 50-60 mils thickness. Fiberglass mat material was then applied over the still liquid coating taking care to avoid wrinkle formulation to as great an extent as possible. A short nap paint roller was then used to dry roll the coating layer until the fiberglass-reinforcement mat was thoroughly wetted out. The layer was then rib rolled to remove air and level the surface, and the resulting fiberglass-reinforced base coat was allowed to harden.

EXAMPLE 3

The following formulation of epoxy resin containing top coat material was prepared:

| | percent |
|---|---|
| EPON 828[1] | 19.81 |
| DER 671-T-75[2] | 7.30 |
| DER 732[2] | 4.86 |
| pigment | 1.51 |
| butyl glycidyl ether | 1.50 |
| ethyl acetate | 0.51 |
| silica | 44.00 |
| aluminum oxide | 9.73 |
| crushed walnut shells | 9.73 |
| bubble release agent | 0.51 |
| flow agent | 0.51 |

[1]One of a series of commercially available epoxy resins based upon condensation reaction of epichlorohydrin and bisphenol-A (Shell Chemical Company).
[2]An epoxy resin obtained from Dow Chemical Company.

To 3 parts by volume of this formulaton was added 1 part of the curing agent identified in Example 1. The admixture was thoroughly stirred to disperse the filler and then troweled over the cured base coat at a nominal 1/16" thickness. Curing of the top coat at ambient temperature of 21° C. then occurred in 12 hours.

The multi-layer structure of primer, base coat and top coat had the following properties:

| | |
|---|---|
| Tensile Strength | 2,500-3,000 psi |
| Compressive Strength | 10,000-12,000 psi |
| Thermal Shock Resistance (Cycle 76° to 4° C.) | 63 cycles (no failure) |
| Cold-Temperature Cure Test | practical limit 2° C. |
| Underwater Cure Test | No discoloration; supports foot traffic after 16 hours |

EXAMPLE 4

A sealer coat formulation was prepared by mixing the following:

| | parts by weight |
|---|---|
| EPON 1009[1] | 45.5 |
| titanium dioxide | 4.2 |
| polyethylene wax | 2.0 |
| urea formaldehyde polymer | 4.4 |
| Bentone 27[4] | 2.5 |
| cellulose acetate butyrate | 1.5 |
| flow agents | 0.7 |
| solvent mixture[5] | 25.0 |

[4]An organic derivative of hydrous magnesium aluminum silicate minerals.
[5]Methyl isobutyl ketone: n butyl acetate: xylene = 4:1:1.

To this was added 34 parts of an adduct of toluene diisocyanate and 2-dimethoxy-1-butanol. The resulting mixture was applied using a roller as a sealer coat over the cured top coat of Example 3. Upon curing of the sealer coat, a multi-layered, fiberglass-reinforced floor construction was formed having the following physical properties:

| | |
|---|---|
| Tensile Strength: (ASTM C307-55) | 4,750 psi |
| Compressive Strength: (ASTM C-306-55) | 5,640 psi |
| Flexural Strength | 6,090 psi |
| Hardness Shore D: | 73 |
| Elongation: | 2% full system |
| Thermal Shock: 183° F. to 45° F., 50 cycles | No failure |
| Taber Abrasion Factor (CS 17F Wheel, 1000 gm wt 1000 revolutions) | less than 15 |

As will be obvious to one skilled in the art many modifications, variations, alterations and the like may be made in the practice of this invention without departing from the spirit and scope thereof as set forth in the preceding specification or in the claims which follow.

What is claimed is:

1. A multi-layered floor construction comprising:
- a floor substrate;
- a cured primer coat of an epoxy resin applied over and adhering to said substrate;
- a cured, fiberglass-reinforced base coat of an epoxy resin applied over and bonded to said primer coating;
- a cured top coat of an epoxy resin containing filler material applied over and bonded to said fiberglass-reinforced base coat; and
- a cured sealer coat of a polyurethane resin applied over and bonded to said top coat.

2. A floor construction in accordance with claim 1 wherein said floor substrate is the surface of a concrete floor.

3. A floor construction in accordance with claim 1 wherein said epoxy resin of said primer coat is a condensation product of epichlorohydrin and bisphenol A.

4. A floor construction in accordance with claim 1 wherein said primer coat additionally comprises a curing agent.

5. A floor construction in accordance with claim 4 wherein said curing agent is an amine.

6. A floor construction in accordance with claim 4 wherein said curing agent is an adduct from a polyglycidyl ether of a polyphenyl and a cycloaliphatic or cycloaliphatic-aliphatic di-primary diamine.

7. A floor construction in accordance with claim 1 wherein said primer coat has a dry thickness of from about 1 to about 5 mils.

8. A floor construction in accordance with claim 1 wherein said epoxy resin of said base coat is a condensation product of epichlorohydrin and bisphenol A.

9. A floor construction in accordance with claim 1 wherein said fiberglass-reinforced base coat of epoxy resin additionally comprises a curing agent.

10. A floor construction in accordance with claim 9 wherein said curing agent is an amine.

11. A floor construction in accordance with claim 9 wherein said curing agent is an adduct from a polyglycidyl ether of a polyphenyl and a cycloaliphatic or cycloaliphatic-aliphatic di-primary diamine.

12. A floor construction in accordance with claim 1 wherein said fiberglass-reinforced base coat has a dry thickness from about ⅛ inch to about 1/32 inch.

13. A floor construction in accordance with claim 1 wherein said epoxy resin of said base coat is identical to said epoxy resin of said primer coat.

14. A floor construction in accordance with claim 1 wherein said epoxy resin of said top coat is a condensation product of epichlorohydrin and bisphenol A.

15. A floor construction in accordance with claim 1 wherein said filler material of said top coat comprises solid particles a major portion of which have particle sizes less than about 20 mesh.

16. A floor construction in accordance with claim 1 wherein said filler material of said top coat comprises an amount greater than about 50% by weight based upon the weight of said top coat.

17. A floor construction in accordance with claim 1 wherein said top coat additionally comprises a curing agent.

18. A floor construction in accordance with claim 17 wherein said curing agent is an amine.

19. A floor construction in accordance with claim 17 wherein curing agent is an adduct from a polyglycidyl ether of a polyphenyl and a cycloaliphatic or cycloaliphatic-aliphatic di-primary diamine.

20. A floor construction in accordance with claim 1 wherein said top coat has a dry thickness from about ¼ to about 1/16 inch.

21. A floor construction in accordance with claim 1 wherein said epoxy resins of said top coat, primer coat and base coat are identical.

22. A floor construction in accordance with claim 1 wherein said polyurethane resin of said sealer coat is derived from reacting a polyisocyanate with a polyol.

23. A floor construction in accordance with claim 22 wherein said polyisocyanate is an aromatic diisocyanate.

24. A floor construction in accordance with claim 22 wherein said polyisocyanate is an aliphatic diisocyanate.

25. A floor construction in accordance with claim 22 wherein said polyol is an epoxy polyol, polyester polyol or acrylic polyol.

26. A floor construction in accordance with claim 1 wherein said sealer coat additionally comprises a polymer of urea and formaldehyde.

27. A floor construction in accordance with claim 1 wherein said sealer coat additionally comprises a catalyst.

28. A floor construction in accordance with claim 1 wherein said sealer coat has a dry thickness from about 2 to about 20 mils.

29. A multi-layered floor construction comprising:
- a porous concrete substrate;
- a cured, primer coat applied over and partially absorbed into said substrate, said primer coat comprising an epoxy resin and a curing agent and having a dry thickness of less than about 5 mils;
- a cured, fiberglass-reinforced base coat applied over and bonded to said primer coat, said base coat comprising a fiberglass mat, an epoxy resin and a curing agent, and having a dry thickness from about ⅛ to about 1/32 inch;
- a cured, top coat applied over and bonded to said fiberglass-reinforced base coat, said top coat comprising an epoxy resin, a curing agent and filler particles, and having a dry thickness from about ¼ to about 1/16 inch; and
- a cured, sealer coat applied over and bonded to said top coat, said sealer coat comprising a polyurethane resin derived from reacting a polyisocyanate with a polyol, and having a dry thickness from about 2 to about 20 mils.

30. A floor construction in accordance with claim 29 wherein said polyisocyanate is an aliphatic diisocyanate.

31. A floor construction in accordance with claim 29 wherein said polyol is an epoxy polyol, polyester polyol or acrylic polyol.

32. A floor construction in accordance with claim 29 wherein said sealer coat additionally comprises a urea formaldehyde polymer.

33. A floor construction in accordance with claim 29 wherein said sealer coat additionally comprises a catalyst.

34. A multi-layered floor construction comprising:
- a floor substrate;
- a cured primer coat of an epoxy resin applied over and adhering to said substrate;
- a cured, fiberglass-reinforced base coat of an epoxy resin applied over and bonded to said primer coat;
- a cured top coat of an epoxy resin containing a filler material applied over and bonded to said fiberglass-reinforced base coat; and a cured sealer coat of polyurethane resin and polyethylene wax applied over and bonded to said top coat.

35. A multi-layered floor construction comprising:
- a floor substrate;
- a cured primer coat of an epoxy resin applied over and adhering to said substrate;
- a cured, fiberglass-reinforced base coat of an epoxy resin applied over and bonded to said primer coat;
- a cured top coat of an epoxy resin containing a filler material applied over and bonded to said fiberglass-reinforced base coat; and
- a cured sealer coat of a polyurethane resin, derived from reacting an aromatic polyisocyanate and a polyol, applied over and bonded to said top coat.

36. A multi-layered floor construction comprising:
- a floor substrate;
- a cured primer coat of an epoxy resin applied over and adhering to said substrate;
- a cured, fiberglass-reinforced base coat of an epoxy resin applied over and bonded to said primer coat;
- a cured top coat of an epoxy resin containing a filler material applied over and bonded to said fiberglass-reinforced base coat; and
- a cured sealer coat of a polyurethane resin and a urea formaldehyde polymer applied over and bonded to said top coat.

37. A method of forming a multi-layered floor construction in accordance with claim 1 comprising:
- preparing the surface of a floor substrate to be covered;
- applying an epoxy resin as a primer coat over said prepared floor substrate, said primer coat being capable of adhering to said substrate;
- curing said primer coat to form a cured primer coat;
- applying an epoxy resin over said cured, primer coat, said epoxy resin being capable of bonding to said primer coat;
- while said epoxy resin is uncured placing a permeable fiberglass mat over said epoxy resin;

permitting said epoxy resin to thoroughly permeate said fiberglass mat so as to form a substantially unitary mass of epoxy resin having fiberglass mat dispersed throughout;

curing said substantially unitary mass of epoxy resin and fiberglass mat to form a cured, fiberglass-reinforced base coat;

applying an epoxy resin as a top coat over said cured, fiberglass-reinforced base coat, said top coat being capable of bonding to said base coat and having filler material admixed therewith;

curing said top coat containing filler material to form a cured top coat;

applying a polyurethane resin as a sealer coat over said cured top coat, said sealer coat being capable of bonding to said cured, top coat; and curing said sealer coat to form a cured, sealer coat and thereby to form said floor construction.

38. A method in accordance with claim 37 wherein said floor substrate comprises concrete and said preparation of the surface of said floor substrate comprises sand-blasting or acid-etching.

39. A method in accordance with claim 37 wherein said epoxy resins of said primer coat, base coat and top coat are identical.

40. A method in accordance with claim 37 wherein said filler material comprises particles of an inorganic material, a major portion of which have particle sizes less than about 20 mesh.

41. A method in accordance with claim 37 wherein polyurethane resin of said sealer coat is derived from reacting a polyisocyanate with a polyol.

42. A method in accordance with claim 37 wherein said primer coat, said base coat and said top coat additionally comprise curing agents.

43. A method in accordance with claim 37 wherein said sealer coat additionally comprises a urea formaldehyde polymer.

44. A method in accordance with claim 37 wherein sealer coat additionally comprises a catalyst.

* * * * *